(12) United States Patent
Prezecki, II

(10) Patent No.: US 9,731,654 B2
(45) Date of Patent: Aug. 15, 2017

(54) SLIDING CARGO TONNEAU COVER

(71) Applicant: FORD GLOBAL TECHNOLOGIES, LLC, Dearborn, MI (US)

(72) Inventor: Leonard Gus Prezecki, II, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 8 days.

(21) Appl. No.: 14/884,389

(22) Filed: Oct. 15, 2015

(65) Prior Publication Data
US 2017/0106800 A1    Apr. 20, 2017

(51) Int. Cl.
*B60R 5/04*    (2006.01)
(52) U.S. Cl.
CPC .................... *B60R 5/047* (2013.01)
(58) Field of Classification Search
CPC ................................................. B60R 5/047
USPC ....................................................... 296/24.43
See application file for complete search history.

(56) References Cited

U.S. PATENT DOCUMENTS

| | | | |
|---|---|---|---|
| 4,202,577 A | | 5/1980 | Breitschwerdt et al. |
| 4,277,097 A | * | 7/1981 | Lalanne ................. B60R 5/045 |
| | | | 224/542 |
| 5,011,208 A | | 4/1991 | Lewallen |
| 5,584,523 A | | 12/1996 | Kawaguchi |
| 5,711,568 A | | 1/1998 | Diem et al. |
| 6,808,221 B2 | * | 10/2004 | Wheatley ................. B60J 7/102 |
| | | | 296/100.15 |
| 6,843,518 B2 | * | 1/2005 | Schlecht .............. B60N 2/3011 |
| | | | 280/749 |
| 8,465,079 B2 | * | 6/2013 | Saito ....................... B60R 5/047 |
| | | | 296/100.16 |
| 9,016,758 B1 | | 4/2015 | Lee et al. |
| 9,302,627 B1 | * | 4/2016 | Shahmehri ............. B60R 5/047 |
| 2003/0062736 A1 | | 4/2003 | Ulert et al. |

FOREIGN PATENT DOCUMENTS

| | | | | |
|---|---|---|---|---|
| DE | 19706355 C1 | * | 1/1998 | ............ B60R 5/047 |
| DE | 102008015231 A1 | * | 9/2009 | ............ B60R 5/047 |
| KR | 20040084039 A | | 10/2004 | |
| WO | 2014132224 A1 | | 9/2014 | |

OTHER PUBLICATIONS

English machine translation of KR20040084039A.

* cited by examiner

*Primary Examiner* — Pinel Romain
(74) *Attorney, Agent, or Firm* — Vichit Chea; King & Schickli, PLLC

(57) ABSTRACT

A tonneau cover assembly for a vehicle cargo area includes a tonneau retractor assembly and an actuator disposed to urge the tonneau retractor assembly against a vehicle seatback. A flexible tonneau panel deploys from and retracts into the tonneau retractor assembly. The actuator includes a bracket arrangement including a pair of opposed brackets each slidingly receiving a tonneau retractor pivot rod end therein. The actuator further includes a biasing element configured to urge each bracket towards the vehicle seatback. A support member carries the bracket arrangement. Each bracket slidingly translates over a fixed pivot point. The biasing element is operatively connected at a first end to a bracket and at a second, opposed end to the fixed pivot point to urge the tonneau retractor assembly against a vehicle seatback.

16 Claims, 4 Drawing Sheets

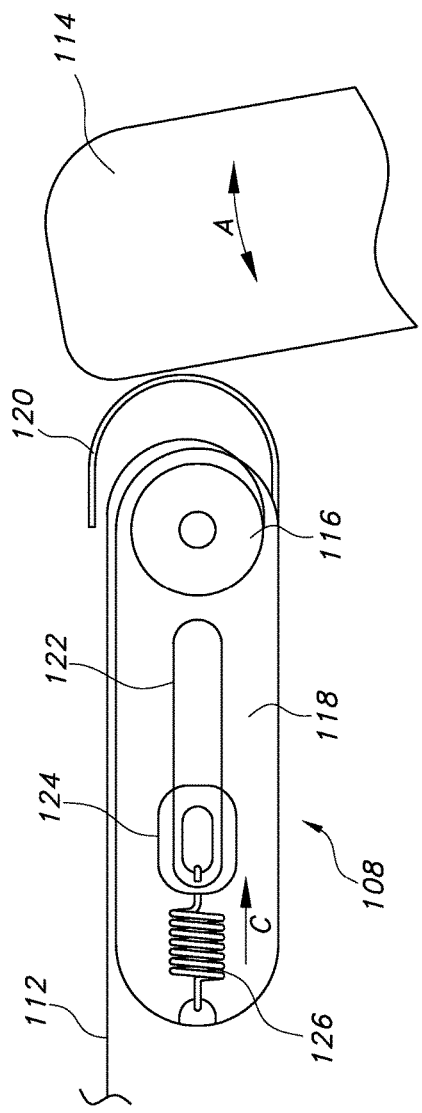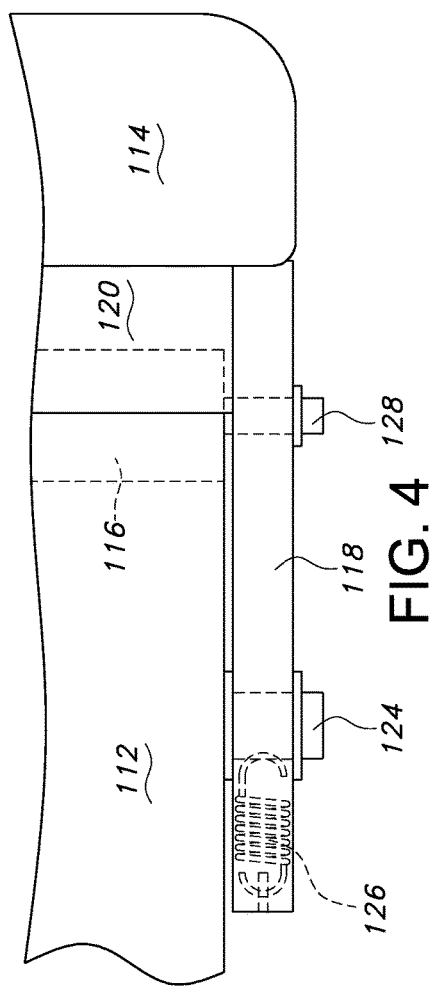
FIG. 3
FIG. 4

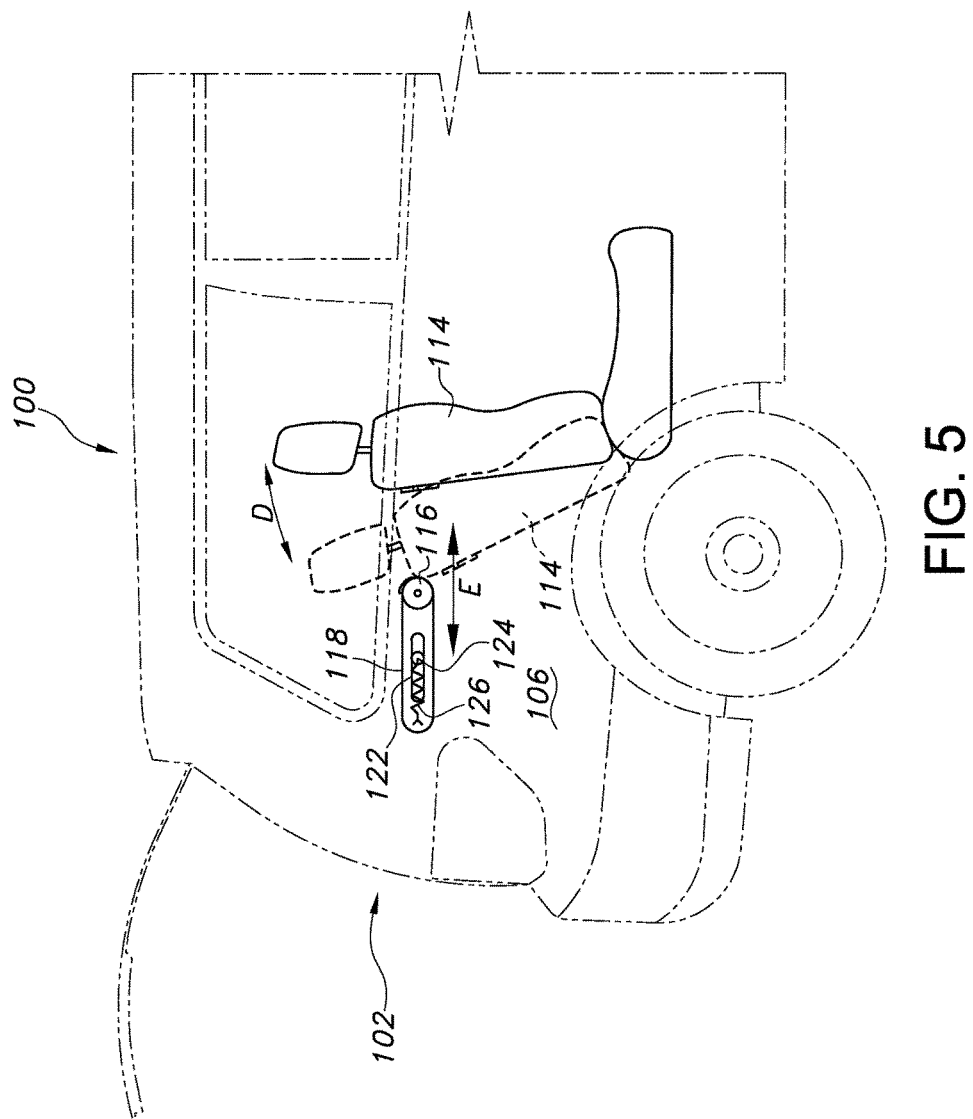

SLIDING CARGO TONNEAU COVER

TECHNICAL FIELD

This disclosure relates generally to vehicle cargo covers or tonneau covers. More particularly, the disclosure relates to a tonneau retractor assembly configured to travel fore and aft as a vehicle seatback is reclined and/or raised, without creating a gap between the tonneau retractor and the seatback.

BACKGROUND

It is known to provide deployable coverings for vehicle cargo areas, for example for the cargo areas of sport-utility vehicles (SUVs), hatchbacks, etc. Such cargo or tonneau covers provide utility in hiding items held in the vehicle cargo area from view, reducing the likelihood of theft. Additionally, tonneau covers serve to protect items held in the cargo area from, e.g., direct sunlight.

Conventional tonneau covers are typically provided as a separate roll-type shade or covering associated with a deploying/retracting mechanism, attached to the rear of a vehicle second or third seat row seatback. The tonneau cover is stored in and deployed from a roll, typically defining a width dimension that substantially matches the width of the vehicle cargo area. The mechanism for deploying/retracting the tonneau cover is typically similar to that used in retractable seat belts or roll-type shades, and does not require extensive description herein. To deploy, the user need only grasp the exposed end of the tonneau cover, or a handle associated with that end, and pull. A detent mechanism may be provided to prevent the cover from inadvertently retracting until the user so desires. Alternatively or additionally, a hook or other retainer may be provided in the vehicle cargo area to hold the tonneau cover in a desired deployed orientation.

Such conventional cargo covers are effective for their intended purpose, but suffer from certain disadvantages. Because the tonneau roll and deploying/retracting mechanism are provided as a unit for attachment to a seatback rear, typically a gap through which items in the cargo area may be seen is defined between the tonneau cover assembly and the vehicle seatback. This is particularly evident when the seatback is translated to the fully upright position. This is because with conventional cargo cover assemblies used in combination with reclining seatbacks, it is necessary to position the cargo cover assembly to account for a reclined position of the seatback, leaving a gap between the cargo cover assembly and the seatback. This gap disadvantageously creates a section of the cargo area C that is uncovered, particularly when the seatback is in the fully upright position, and a portion of the vehicle cargo area is often undesirably exposed.

To solve this and other problems, the present disclosure relates to a tonneau cover assembly for a vehicle cargo area. The described tonneau cover assembly includes a biasing mechanism that prevents creation of a gap between the assembly and a vehicle seatback with which the assembly is associated.

SUMMARY

In accordance with the purposes and benefits described herein, in one aspect of the disclosure a tonneau cover assembly for a vehicle cargo area is described, comprising a tonneau retractor assembly and an actuator disposed to urge the tonneau retractor assembly against a vehicle seatback. A flexible tonneau panel is configured to deploy from and retract into the tonneau retractor assembly. In embodiments, the actuator comprises a bracket arrangement including a pair of opposed brackets each slidingly receiving a tonneau retractor pivot rod end therein. The actuator further comprises a biasing element configured to urge each bracket towards the vehicle seatback. A support member carries the bracket arrangement.

In use, each bracket slidingly translates over a fixed pivot point. The biasing element is operatively connected at a first end to a bracket and at a second, opposed end to the fixed pivot point whereby the biasing element urges the tonneau retractor assembly against the vehicle seatback. In embodiments, the biasing element is a spring. However, alternative embodiments are contemplated including elastic members, linear actuators, gas springs, gas cylinders, and others.

In another aspect of the disclosure, a vehicle is described including a cargo area defined at least by a floor area, side walls, and a vehicle seatback. A vehicle cargo area tonneau cover assembly includes a tonneau retractor assembly and an actuator disposed to urge the tonneau cover assembly against the vehicle seatback. As described above, the actuator comprises a bracket assembly including a pair of brackets each slidingly receiving a tonneau retractor pivot rod end therein and a biasing element configured to urge the bracket assembly towards the vehicle seatback.

In yet another aspect of the disclosure, a tonneau cover assembly for a vehicle cargo area is described, including a tonneau retractor assembly including a deployable and retractable flexible tonneau panel and a spring actuator disposed to urge the one or more tonneau retractor assemblies against a vehicle seatback. In embodiments, the spring actuator comprises a spring force bracket assembly including a pair of brackets each slidingly receiving a tonneau retractor pivot rod end through a slot therein and a spring configured to urge the bracket assembly towards the vehicle seatback. A support member carries the bracket assembly. Each bracket is disposed to slidingly translate over a fixed pivot point. The spring is operatively connected at a first end to a bracket and at a second, opposed end to the fixed pivot point.

In still other aspects, vehicles including the above-summarized tonneau cover assembly are described.

In the following description, there are shown and described embodiments of the disclosed tonneau cover assembly. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed tonneau cover assembly, and together with the description serve to explain certain principles thereof. In the drawing:

FIG. 3 is a side view of a bracket and actuator for the retractable tonneau cover assembly of FIG. 2;

FIG. 4 is a top view of a bracket and actuator for the retractable tonneau cover assembly of FIG. 2; and FIG. 5 is a side view of the retractable tonneau cover assembly of FIG. 2 in use in a vehicle.

Reference will now be made in detail to embodiments of the disclosed vehicle tonneau cover assembly, examples of which are illustrated in the accompanying drawing figures.

DETAILED DESCRIPTION

The presently disclosed vehicle tonneau cover assembly is discussed herein for convenience in the context of a unitary vehicle seatback. However, it will be appreciated and described that the described assembly is also suitable for vehicle split seatbacks, for example 60:40 split seatbacks, 50:50 split seatbacks, three way split seatbacks, etc. Accordingly, the disclosure will not be taken as limiting.

Also, various retractor mechanisms for tonneau covers as are discussed herein are well-known in the art, for example the deploying/retracting mechanisms used in, e.g., retractable vehicle seat belts, roll-type shades, etc. At a high level, such mechanisms include one or more of a rotary reel configured for deploying/retracting a flexible panel or web, a detent mechanism for preventing unwanted retraction of the panel once deployed, and a release mechanism to allow deployment/retraction of the panel. The skilled artisan is very familiar with such mechanisms, and so they will not be extensively described herein.

Figure 1:
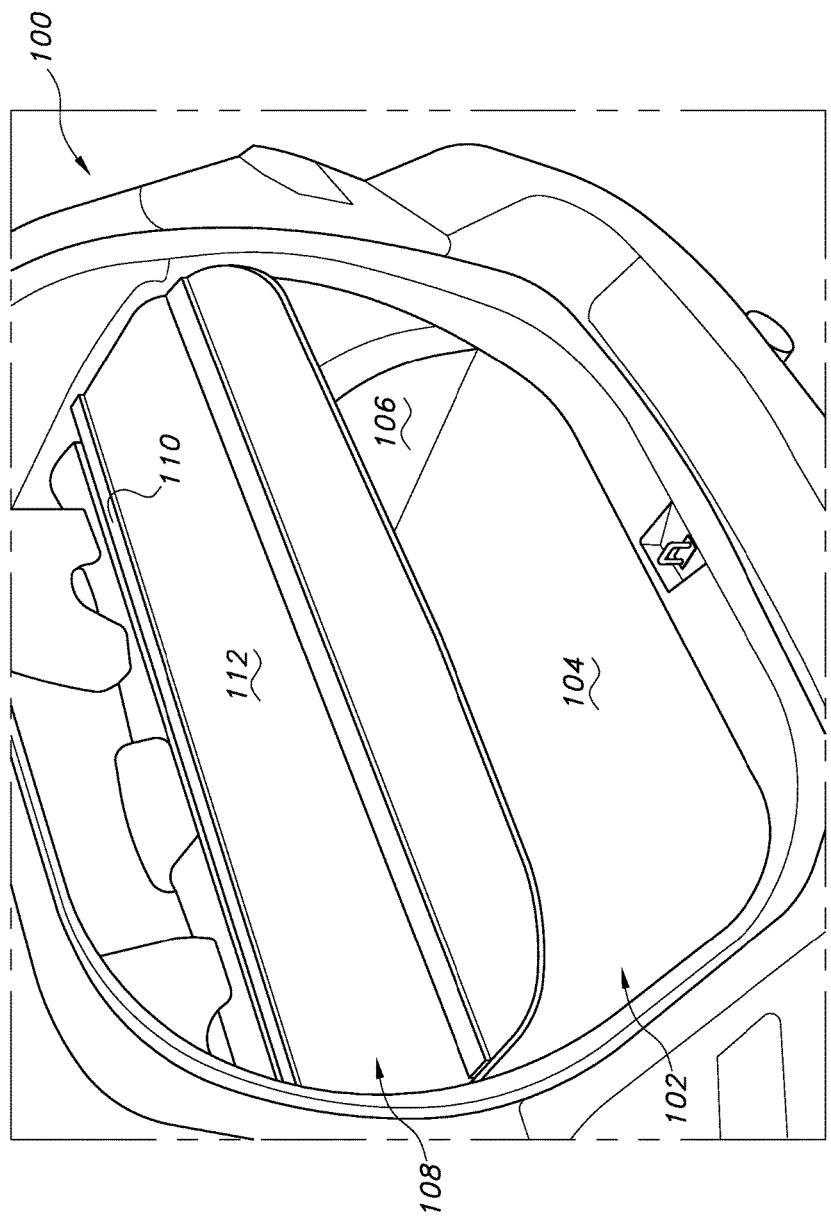
FIG. 1 depicts a vehicle rear cargo area and retractable tonneau cover.

With reference to FIG. 1, a vehicle 100 is shown including a cargo area 102 defined by a floor 104 and opposed side walls 106. A tonneau cover assembly 108 is provided, including a retractable tonneau cover 112.

Figure 2:
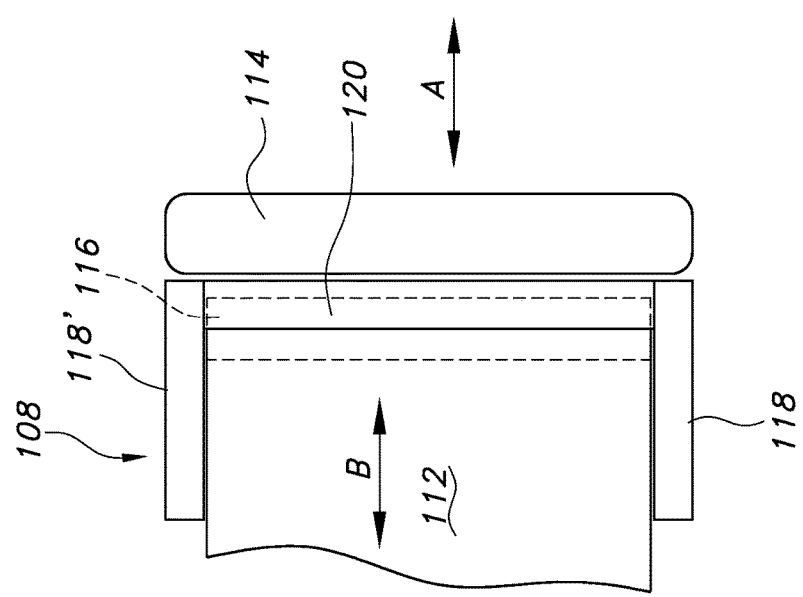
FIG. 2 is a top view of a retractable tonneau cover assembly according to the present disclosure.

With reference to FIG. 2, the tonneau cover assembly 108 is shown contacting a vehicle seatback 114. As is known, such seatbacks 114 are configured to translate between a reclined configuration and a fully upright configuration (see arrow A). As shown, the tonneau cover assembly 108 includes a tonneau retractor 116 of known configuration, a deployable/retractable tonneau cover 112 (see arrow B), and a pair of opposed brackets 118, 118' carrying the tonneau retractor 116 as will be described. A support member 120 carries the opposed brackets 118, 118'. In the depicted embodiment, the support member 120 is a roll shield (see also FIG. 3), but as will be appreciated any suitable support member 120 embodiment such as a strut, a tonneau retractor housing, and others is adaptable for use herein, and all such alternative embodiments are contemplated for use herein.

FIGS. 3 and 4 show different views of a portion of the tonneau cover assembly 108 in isolation. As previously described, a tonneau retractor 116 is carried by a pair of opposed brackets 118, 118' (only one bracket visible in this view). As shown in FIG. 4, each bracket 118, 118' receives a tonneau retractor pivot rod 128 end therethrough. A structural member 120 carries the opposed brackets 118, 118' and contacts the vehicle seatback 114. Each bracket 118, 118' includes a slot 122 which is configured to slidingly translate over a fixed pivot point 124. As will be described, each fixed pivot point 124 will typically be disposed in a vehicle cargo area 102, such as on side walls 106. Each bracket 118, 118' includes an actuator 126 configured to urge the bracket and structural member 114 in a vehicle-forward direction (see arrow C).

In the depicted embodiment, the actuator 126 is a biasing element such as a spring, operatively connected at a first end to bracket 118, 118' and at a second, opposed end to the fixed pivot point 124. However, it will appreciated that a spring is but one potentially suitable actuator for the present assembly. Numerous alternative actuators are suitable for the presently described assembly, including without intending any limitation linear actuators, gas spring cylinders, gas cylinders, pneumatic actuators, electric actuators, and others. The caveat is that the actuator must be configured to, at least when the vehicle seatback is reclined in a vehicle-rear direction, urge the opposed brackets 118, 118' and structural member 120 in a vehicle-forward direction as the vehicle seatback is returned to the upright position, thus preventing any gap between the structural member 120 and the vehicle seatback 114.

As will be appreciated and with reference to FIG. 5, as a user reclines (arrow D) a vehicle seatback 114 such as a second- or third-row seatback, the seatback will bias the brackets 118, 118' and structural member 120 in a vehicle-rearward direction (arrow E). As brackets 118, 118' translate rearwardly, fixed pivot point 124 will slidingly translate along slot 122 and concurrently elongating actuator 126. As shown, structural member 120 remains in contact with seatback 114. Then, when the user returns the seatback 114 to a fully upright position, actuator 126 will continue to urge brackets 118, 118' in a vehicle-forward direction, thus maintaining the contact between structural member 120 and seatback 114. In the depicted embodiment, this is done by a spring actuator 126, which as shown elongates as the seatback 114 is reclined and contracts as the seatback 114 is placed upright. However, as discussed above a number of alternative actuators 126 are suitable for inclusion in the described mechanism and are contemplated for use therein.

As will be appreciated, because each bracket 118, 118' and actuator 126 operates independently of the other, the described mechanism operates suitably for its intended purpose even if seatback 114 is a split seatback (embodiment not shown). That is, if only one portion of the seatback 114 is reclined, the mechanism described above will still operate to maintain contact between the structural member 120 and the seatback portion, preventing any gaps therebetween.

Obvious modifications and variations are possible in light of the above teachings. All such modifications and variations are within the scope of the appended claims when interpreted in accordance with the breadth to which they are fairly, legally and equitably entitled.

What is claimed:

1. A tonneau cover assembly for a vehicle cargo area, comprising:
   a tonneau retractor assembly; and
   an actuator disposed to urge the tonneau retractor assembly against a vehicle seatback;
   wherein the actuator comprises a bracket arrangement including a pair of opposed brackets each slidingly receiving a tonneau retractor pivot rod end therein.

2. The assembly of claim 1, including a flexible tonneau panel configured to deploy from and retract into the tonneau retractor assembly.

3. The assembly of claim 1, wherein the actuator further comprises a biasing element configured to urge each bracket towards the vehicle seatback.

4. The assembly of claim 3, wherein each bracket slidingly translates over a fixed pivot point, and further wherein the biasing element is operatively connected at a first end to a bracket and at a second, opposed end to the fixed pivot point.

5. The assembly of claim 4, wherein the biasing element is a spring.

6. The assembly of claim 1, further including a support member carrying the bracket arrangement.

7. A vehicle including the assembly of claim 1.

8. A vehicle, comprising:
a cargo area defined at least by a floor area, side walls, and a vehicle seatback;
a cargo area tonneau cover assembly comprising a tonneau retractor assembly; and
an actuator disposed to urge the tonneau cover assembly against the vehicle seatback;
wherein the actuator comprises a bracket assembly including a pair of brackets each slidingly receiving a tonneau retractor pivot rod end therein and a biasing element configured to urge the bracket assembly towards the vehicle seatback.

9. The vehicle of claim 8, including a flexible tonneau panel configured to deploy from and retract into the tonneau retractor assembly.

10. The vehicle of claim 8, further including a support member carrying the bracket assembly.

11. The vehicle of claim 8, wherein each bracket slidingly translates over a fixed pivot point disposed on the cargo area side wall, and further wherein the biasing element is operatively connected at a first end to a bracket and at a second, opposed end to the fixed pivot point.

12. The vehicle of claim 11, wherein the biasing element is a spring.

13. A tonneau cover assembly for a vehicle cargo area, comprising:
a tonneau retractor assembly including a deployable and retractable flexible tonneau panel; and
a spring actuator disposed to urge the one or more tonneau retractor assemblies against a vehicle seatback;
wherein the spring actuator comprises a spring force bracket assembly including a pair of brackets each slidingly receiving a tonneau retractor pivot rod end through a slot therein and a spring configured to urge the bracket assembly towards the vehicle seatback.

14. The assembly of claim 13, further including a support member carrying the bracket assembly.

15. The assembly of claim 13, wherein each bracket is disposed to slidingly translate over a fixed pivot point, and further wherein the spring is operatively connected at a first end to a bracket and at a second, opposed end to the fixed pivot point.

16. A vehicle including the assembly of claim 13.

* * * * *